Oct. 18, 1955    H. RUEHL ET AL    2,720,735
WORK HOLDER FOR CYLINDER LINERS
Filed March 27, 1953    2 Sheets-Sheet 1

INVENTORS
HAROLD RUEHL
EDWARD F. O'NEIL
MELVIN E. HANSING
Paul O. Pippel
ATTY.

Oct. 18, 1955     H. RUEHL ET AL     2,720,735
WORK HOLDER FOR CYLINDER LINERS
Filed March 27, 1953     2 Sheets-Sheet 2
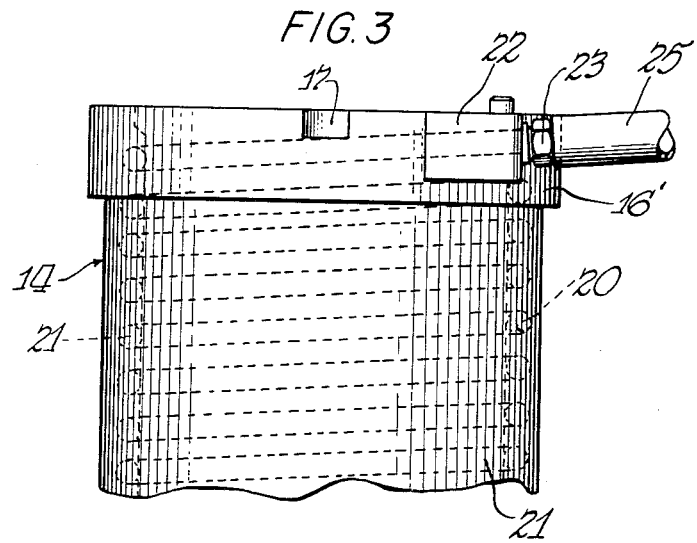
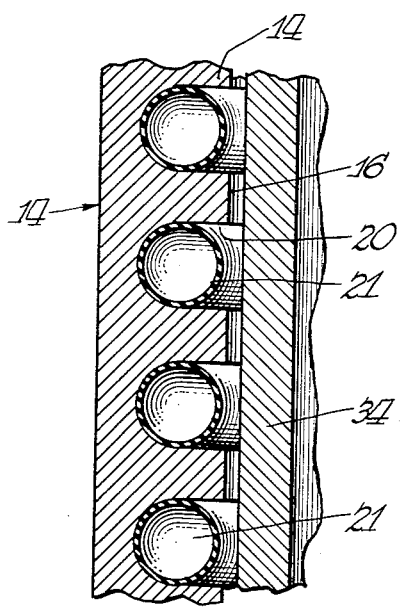
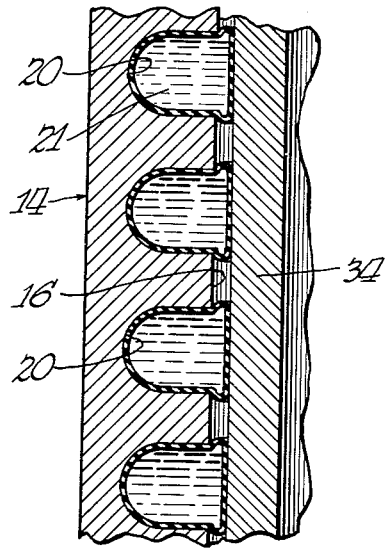
INVENTORS
HAROLD RUEHL
EDWARD F. O'NEIL
MELVIN E. HANSING
ATTY.

United States Patent Office 2,720,735
Patented Oct. 18, 1955

2,720,735

WORK HOLDER FOR CYLINDER LINERS

Harold Ruehl, Chicago, Edward F. O'Neil, Maywood, and Melvin E. Hansing, Lombard, Ill.

Application March 27, 1953, Serial No. 345,198

3 Claims. (Cl. 51—227)

This invention relates to an improved work holder for supporting cylindrical objects. More specifically this invention relates to an improved work holder for floatingly supporting a cylinder liner in position during a machining operation.

In the manufacture of sleeves or liners used in connection with the cylinders of internal combustion engines it is generally necessary to subject the cast liner to a number of operations which might include boring or honing. The internal peripheral surface of the sleeve must be generally held to very close tolerances. Also the finished sleeve must be substantially perfectly round and any distortion will serious affect the usefulness of the finished liner. Great difficulty has been experienced in providing adequate work holding devices to hold the sleeve in position during boring or honing operations.

In general, mechanical work holding devices have been utilized, these holding devices including means whereby the external surface of the sleeve is gripped or held by means of mechanical devices which may be tightened into place by camming arrangements, bolts, etc. One such way of providing a work holder is to secure a rigid work support on the bed of the machine which must accomplish the machining operation, the work holder having a bore within which the sleeve is gripped by means of a mechanical device. The mechanical device may be a split sleeve which can be tightened around the outer peripheral surface of the sleeve to be worked upon. Units of this type have been found to be very unsatisfactory since the clamping of the sleeve, by virtue of the mechanical devices employed, would not be even and upon removal of the sleeve from the work piece the sleeve would have a tendency to change its shape or the shape in which it was held within the work piece thus resulting in an imperfect cylinder.

Even with the best conventional work holding devices it was found that the distortion of the sleeve after removal from the work holder would be such that the number of rejects would be extensive. The out-of-round condition which would occur with these conventional devices was generally due to the fact that the work piece could not be adequately and properly clamped on all sides and all portions of the piece with an equal pressure. Upon removal of the sleeve it would of course spring back to its unclamped condition which would result in imperfect roundness. It is a prime object of this invention to provide an improved work holding device wherein the work piece is properly clamped on all sides which will result in a substantially perfect object after a final machining operation.

It is another object of this invention to provide an improved work holder comprising a support having a cylindrical bore to receive the work piece in mating relation, the bore including an expansible element which is adapted to engage the sides of the work piece and to floatingly support the same within the bore with equal pressure applied to the sides of the work piece so that a minimum of distortion results during the machining operation.

A still further and more specific object is the provision of an improved work holder including a support having a bore, the bore including a helically extending recess in which an expansible conduit is positioned, the conduit being in communication with a source of pressure and being expansible into engagement with the outer peripheral surface of a sleeve to support the sleeve within the bore and on the support in floating relation relative to the inner surface of the bore of said support. These and more specific objects will become more readily apparent from a reading of the description when examined in connection with the accompanying sheets of drawings.

In the drawings:

Figure 3 is an elevational view of a portion of a cylindrical work holding member adapted to receive and clamp a sleeve member in position for machining;

Figure 4 is a fragmentary sectional view of a portion of a work holder showing the holder in position with respect to a sleeve just prior to the gripping operation of the holder; and Figure 5 is a cross-sectional view of the work holder, similar to Figure 4, showing an expansible conduit provided within the work holder in gripping engagement with the outer peripheral surface of a sleeve.

Figure 1:
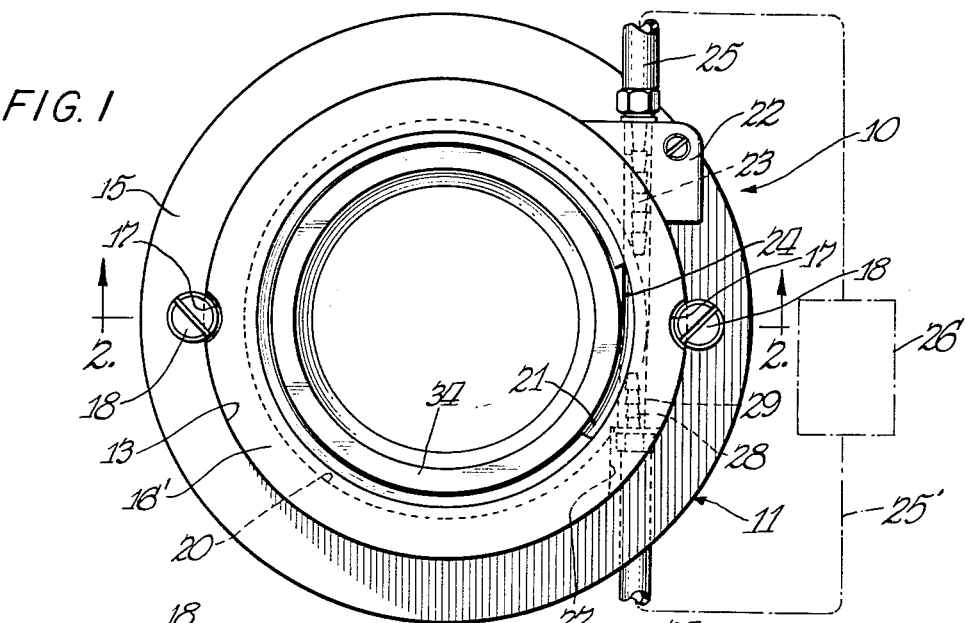
Figure 1 is a plan view of an improved work holder schematically showing the holder connected to a source of fluid under pressure.
Figure 2:
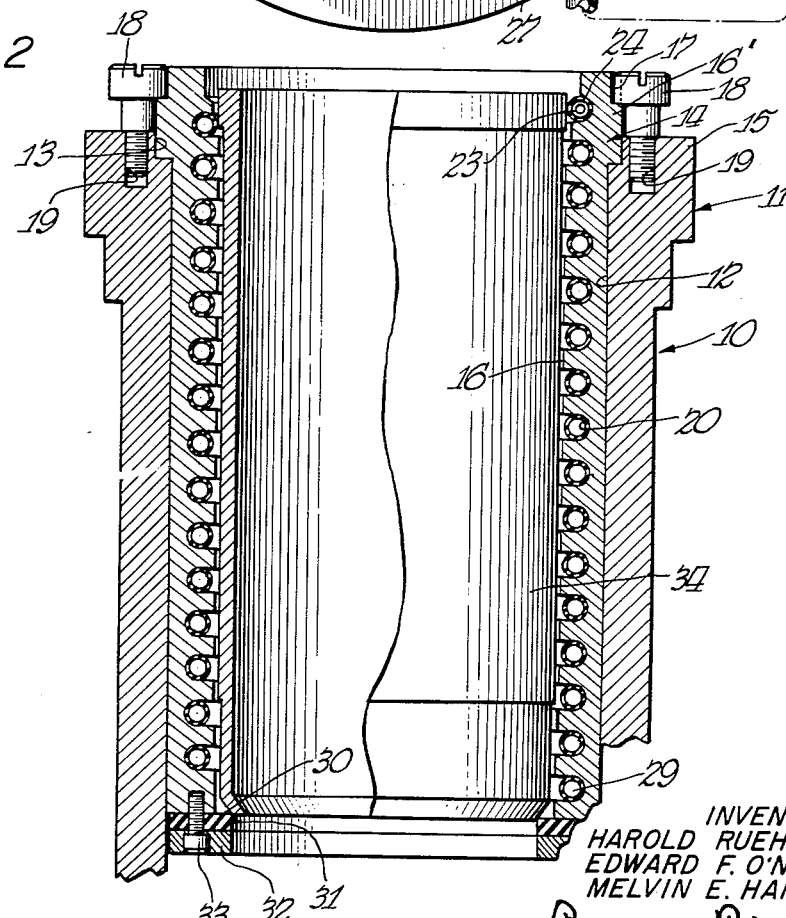
Figure 2 is a cross-sectional view through an improved work holder taken along the line 2—2 of Figure 1, the view including a sleeve positioned within the work holder.

Referring now particularly to Figures 1 and 2, a work holder is generally designated by the reference character 10. The work holder 10 includes a main support 11 having an elongated opening or bore 12. The upper end of the main support 11 is provided with an undercut portion 13 adjacent the upper end of the bore 12. A cylindrical holding member 14 is disposed within the bore 12 in mating or telescoping relation. The main support 11 is provided at its upper end with an annular enlargement 15. The cylindrical holding member is provided with an elongated bore 16 and has at its upper end an enlarged or shoulder portion 16'. The shoulder portion 16' is provided with an undercut recess 17. As best indicated in Figure 2, the cylindrical holding member 14 is placed in the main support 11 in mating or telescoping relation with the shoulder 16' seated in snug relation within the undercut portion 13. A pair of screws 18 engage the shoulder portion 16', the said screws 18 being screwed into threaded bores 19 provided in the main support 11 to securely retain the cylindrical holding member 14 against axial displacement.

The bore 16 of the main support 11 is provided with a spirally extending recess 20 which extends substantially coextensive with the length of the bore 16. The recess 20 supports a conduit 21, the conduit 21 being made of a suitable rubber-like or flexible material and extending spirally substantially coextensive with the recess 20. The upper end of the cylindrical holding member 14 is provided with a projection or boss 22 which supports a conduit connection 23, the conduit connection 23 being in telescoping engagement or communication with an upper end portion 24 of the conduit 21. The conduit connection 23 is suitably connected to a flexible conduit 25 which is adapted to communicate with a source of fluid pressure schematically designated at 26 in Figure 1. The lower end of the cylindrical holding member 14 is provided with a recessed portion 27 which supports a conduit connection 28 in communication with the lower end 29 of the conduit 21. The conduit connection 28 is suitably connected to a conduit 25' leading to the source of fluid pressure 26.

A rubber ring 30 is connected to the lower end of the cylindrical holding member 14. The ring 30 includes an inner periphery 31, the periphery 31 projecting inwardly from the bore 16 of the holding member 14. An annular washer 32 and cap screws 33 (only one of which is shown) suitably connect the rubber ring to the lower end of the cylindrical holding member 14.

In the operation of the work holder 10 a sleeve 34, as shown in Figure 2, is inserted within the bore 16 in mating or telescoping relation. The rubber ring 30 supports the sleeve 34 at its lower end and acts as a stop to limit downward movement of the sleeve 34. The main support 11 is suitably supported on the bed of a machine which for example may be a conventional boring mill or other similar device. The work holder may be placed in axial alignment with a rotating tool (not shown) which may be inserted to work upon the inner-peripheral surface of the sleeve 34. When the sleeve 34 is in the position indicated in Figure 2 a suitable valve arrangement (not shown) causes fluid under pressure to leave the reservoir 26 and to travel through the conduits 25 and 25' to the conduit 21. The fluid under pressure as indicated in Figure 5 causes the conduit 21 to expand outwardly from the recess 20 whereupon the outer surface of the sleeve 34 is held in gripping relation with equal pressure applied to all of the peripheral surface of the sleeve 34. Thus the sleeve 34 is now centered properly with respect to the support 11 and is held free of the bore 16. Stated in another manner the outer peripheral surface of the sleeve 34 is held in floating or laterally spaced relation with respect to the inner surface of the bore 16. Since the sleeve has the pressure applied equally throughout its outer surface, no distortion of the sleeve takes place during the machining operation. It is of course obvious that by this method the conduit 21 grips the outer peripheral surface of the sleeve positively and firmly with pressure being distributed in an even manner throughout the outer peripheral surface of the sleeve. Since the sleeve 34 is now securely held in the work holder 10 the machining operation may take place and after the machining operation has been completed the pressure is released from the conduit 21 whereupon it again assumes the position indicated in Figures 2 and 4, and the conduit is again in its contracted state. Since the sleeve 34 was properly held and the gripping pressure evenly distributed no change in shape takes place after the gripping pressures are released. Thus a substantially perfectly round unit is obtained and the undesirable aspects found with the above mentioned conventional machine are eliminated. It must be understood of course that by the use of the term "fluid" it is readily understood that hydraulic, pneumatic, etc. fluid pressures may be utilized. Applicant has successfully utilized hydraulic and pneumatic pressures in the application of this device.

It can now be seen that the objects of the invention have been successfully achieved by the novel construction disclosed. It must be understood that changes may be made which do not depart from the spirit of the invention as disclosed nor the scope thereof as defined in the appended claims.

What is claimed is:

1. A work holder for holding cylindrical objects comprising a stationary support having an elongated opening, a work holding cylindrical member supported within the opening of said support, means removably locking said cylindrical member on said support, said cylindrical member having an elongated bore provided with an inner peripheral surface adapted to receive a sleeve in telescoping relation, said inner peripheral surface having a continuous helically extending recess substantially coextensive with its length, an expansible conduit disposed in said recess and being substantially coextensive therewith, first and second conduit connections on said cylindrical member, said conduit connections being in communication with respective ends of said conduit and being adapted to connect to a source of fluid under pressure whereby said conduit is expanded outwardly from the recess, said conduit having a gripping surface engaging and tightly gripping the outer peripheral surface of a sleeve to support said sleeve in laterally spaced and work holding relation with respect to the inner peripheral surface of the cylindrical member, and an annular resilient member connected to one end of said cylindrical member to provide a resilient seat for the sleeve during insertion of the same into said bore.

2. A work holder for holding cylindrical objects comprising a stationary support, a work holding cylindrical member removably supported on said support, said cylindrical member having an elongated bore provided with an inner peripheral surface adapted to receive a sleeve in telescoping relation, said inner peripheral surface having a continuous helically extending recess substantially coextensive with its length, an expansible conduit disposed in said recess and being substantially coextensive therewith, first and second conduit connections on said cylindrical member, said conduit connections being in communication with respective ends of said conduit and being adapted to connect to a source of fluid under pressure whereby said conduit is expanded outwardly from the recess, said conduit having a gripping surface engaging and tightly gripping the outer peripheral surface of a sleeve to support said sleeve in laterally spaced and work holding relation with respect to the inner peripheral surface of the cylindrical member, and an annular resilient member connected to one end of said cylindrical member to provide a resilient seat for the sleeve during insertion of the same into said bore.

3. A work holder for machining the inner walls of sleeve type articles having inner and outer peripheral walls comprising a support adapted to be supported adjacent a machining element, a tubular member supported on said support, said tubular member having an elongated inner cylindrical wall open at least at one end, said cylindrical wall being adapted to receive an article with at least one open end in telescoping relation, a continuous helical recess in the inner cylindrical wall of said member, an expansible conduit disposed in said recess, a conduit connection on said expansible conduit whereby said conduit may be expanded inwardly toward the axis of said member, by directing fluid under pressure thereto, said conduit having a gripping surface adapted to tightly engage and grip the outer peripheral wall of a sleeve type of article, to support the article in radially spaced relation with respect to the inner cylindrical wall of the member, whereby a machining element may engage and work upon the inner peripheral wall of the article.

References Cited in the file of this patent
UNITED STATES PATENTS

| | | |
|---|---|---|
| 751,836 | Cumback | Feb. 9, 1904 |
| 1,291,744 | Boyer | Jan. 21, 1919 |
| 2,267,815 | Bush | Dec. 30, 1941 |
| 2,294,138 | Strock | Aug. 25, 1942 |
| 2,534,527 | Myers | Dec. 19, 1950 |

FOREIGN PATENTS

| | | |
|---|---|---|
| 8,706 | Great Britain | May 2, 1895 |